(12) United States Patent
Burguera Albizuri et al.

(10) Patent No.: US 9,010,216 B2
(45) Date of Patent: Apr. 21, 2015

(54) PEDAL FOR MOTOR VEHICLES

(71) Applicant: BATZ, S.COOP., Igorre (ES)

(72) Inventors: Fernando Burguera Albizuri, Bilbao (ES); Yalam Dharma Martin Villarejo, Bilbao (ES); Arturo Alonso Alonso, Bilbao (ES); Iñaki Agirre Pichel, Santurtzi (ES); Lander Llona Furundarena, Lezama (ES)

(73) Assignee: Batz, S. Coop, Igorre (ES)

( * ) Notice: Subject to any disclaimer, the term of this patent is extended or adjusted under 35 U.S.C. 154(b) by 2 days.

(21) Appl. No.: 13/677,290

(22) Filed: Nov. 14, 2012

(65) Prior Publication Data

US 2013/0125698 A1 May 23, 2013

(30) Foreign Application Priority Data

Nov. 17, 2011 (ES) .................................. 201131853

(51) Int. Cl.
| | |
|---|---|
| G05G 1/30 | (2008.04) |
| G05G 1/44 | (2008.04) |
| B60T 7/06 | (2006.01) |
| B60R 21/09 | (2006.01) |
| G05G 1/32 | (2008.04) |
| G05G 1/327 | (2008.04) |

(52) U.S. Cl.
CPC ............. *G05G 1/44* (2013.01); *Y10T 74/20888* (2015.01); *B60T 7/065* (2013.01); *B60R 21/09* (2013.01); *G05G 1/32* (2013.01); *G05G 1/327* (2013.01)

(58) Field of Classification Search
USPC .............................. 74/512, 513, 560; 180/274
See application file for complete search history.

(56) References Cited

U.S. PATENT DOCUMENTS

| | | | | |
|---|---|---|---|---|
| 6,951,152 | B2 * | 10/2005 | Strole ............................. | 74/512 |
| 7,954,589 | B2 * | 6/2011 | Sand et al. .................... | 180/274 |
| 2003/0029267 | A1 * | 2/2003 | Aoki et al. ...................... | 74/560 |
| 2012/0096982 | A1 * | 4/2012 | Blais et al. ...................... | 74/560 |

FOREIGN PATENT DOCUMENTS

| | | |
|---|---|---|
| EP | 1557333 A1 | 7/2005 |
| EP | 1787873 A2 | 5/2007 |
| WO | WO 2010116092 A1 | 10/2010 |

* cited by examiner

*Primary Examiner* — Vicky Johnson
(74) *Attorney, Agent, or Firm* — Tim L. Kitchen; Peter B. Scull; Hamilton, DeSanctis & Cha LLP (57) ABSTRACT

Pedal assemblies for motor vehicles. In one implementation a pedal is pivotable around a shaft that is releasably fixed in a housing of a support piece by a retention member. The retention member is moveable between a first position corresponding to a normal operating condition and a second position corresponding to a head-on collision condition. In the first position a first part of the retention member rests against and holds the rotating shaft in the fixed position within the housing of the support piece and a first surface of the retention member rests against a guide surface of the support piece. The retention member is releasable from the support piece upon a force being applied to it in the event of the head-on collision, the first surface of the retention member adapted to ride along the guide surface of the support piece to cause the retention member to move from the first position to the second position in a manner that causes the first part of the retention member to be moved away from the rotating shaft so that the rotating shaft is moveable within the housing.

32 Claims, 12 Drawing Sheets

PEDAL FOR MOTOR VEHICLES

CROSS-REFERENCE TO RELATED APPLICATIONS

This application relates to and claims the benefit and priority to Spanish Patent Application No. P201131318, filed Nov. 17, 2011.

TECHNICAL FIELD

The invention relates to a pedal assembly of a motor vehicle that comprises a safety mechanism protecting the driver in the event of a head-on collision of the vehicle.

BACKGROUND

There are known pedals for motor vehicles that comprise safety mechanisms that are only activated in the event of a head-on collision. These safety mechanisms have the objective of preventing injury to the vehicle driver's limbs when a head-on collision occurs, preventing for that purpose the pedal from suddenly moving towards the driver.

In a potentially harmful head-on collision, with regard to the pedals, the wall to which the pedals are connected is deformed, pushing the support structure of the pedals and the pedals themselves against the driver. In response to this situation, the safety mechanism is activated to prevent the pedals from impacting against the driver's lower limbs.

European Publication EP1557333A1 describes a pedal with a safety mechanism that pivots around a rotation shaft connected to a support piece, said support piece being connected to a wall that separates the inside of the motor vehicle. The safety mechanism comprises a lever fitted in a pivoting manner on the support piece, which is operated, in the event of a head-on collision, by the substantially deformation-resistant part of the vehicle. When said lever rotates, one end of said lever causes a movement of the rotation shaft that forces said rotation shaft to come away from the support piece.

In European Publication EP1787873A1 the support piece comprises a hole in which is fitted the shaft of the pedal and a support area arranged beneath the hole and adapted to support the pedal in the hole. The safety mechanism comprises a cam fitted in a pivoting manner on the support piece, which in the event of a head-on collision deforms the support area of the support piece, allowing the shaft to be released from the hole.

In International Publication WO2010116092A1 the rotation shaft of the pedal described is housed in parallel grooves arranged in two vertical walls of the support of the pedal. The safety mechanism also comprises a cam fixed in a pivoting manner to the support, which in the event of a collision rotates in relation to the support, allowing the rotation shaft to move along the grooves. The cam comprises grooves, arranged respectively in the walls of the cam, substantially parallel to the grooves of the support, the grooves of the cam being passed through by the rotation shaft of the pedal. The grooves of the cam have the shape of the arc of a circle centred at a point close to the rotation shaft of the cam.

SUMMARY OF THE DISCLOSURE

According to one implementation a pedal is arranged articulated to a support piece of the motor vehicle by a rotation shaft. In the event of a head-on collision, activation means activates the safety mechanism, releasing the rotation shaft in relation to the support piece.

In one implementation the safety mechanism comprises release means that comprises a retention member and on the support piece at least one guide surface. In normal operating conditions of the pedal, the retention member is arranged inserted at least partly in the support piece, retaining the rotation shaft in said support piece.

In the event of a collision, when the activation means acts on the retention member, said retention member moves in a guided manner on the guide surface of the support piece, releasing the rotation shaft.

It is not necessary that the retention member has a rotation point with a shaft inserted in the support piece, as the movement of said retention member is defined by the guide surface of the support piece, on which it is supported. This allows the retention member to be small in size and simple, and also ensures that the movement of the retention member during the activation of the activation means does not have to be circular.

As a result, a pedal with an improved safety mechanism is obtained, one requiring a minimum number of pieces. In addition, with this configuration, the requirements in relation to tolerances are minimal as the support piece does not have to have a housing tight to the shaft with minimal tolerances, nor, likewise, to the retention member, as retention is achieved by fitting the shaft between retention member and the support piece. As a rotation shaft between the retention member and the support piece is not necessary, adjustments associated with said rotation shaft are not necessary.

These and other advantages and characteristics will be made evident in the light of the drawings and the detailed description thereof.

DETAILED DESCRIPTION

The figures show a pedal 1;1' for motor vehicles with a safety mechanism for head-on collisions according to the invention. The pedal 1;1' pivots around a rotation shaft 2;2' attached to a support piece 10;10'.

The pedal 1;1' has a shoe 6;6', shown in FIGS. 1 to 3, 6, 10 and 11, and is connected to a corresponding brake actuator, clutch cylinder, or the like, by means of a rod not shown in the figures.

The safety mechanism comprises means that releases the rotation shaft 2;2' in the event of a head-on collision as a result of the action of activation means 40;40'. In one implementation the release means comprises a retention member 20;20' that, in normal operating conditions of the pedal 1;1' is arranged inserted at least partly in the support piece 10;10' that is fixed to a deformable part of the motor vehicle, the retention member 20;20' retaining the rotation shaft 2;2' in the support piece 10;10'.

In one implementation the retention member 20;20' comprises at least one arm 22,23;22',23' and a segment 21;21', continuous to said arm 22,23;22',23', on which the activation means 40;40' (e.g., deformation-resistant part of the motor vehicle, pyrotechnic actuator, etc.) acts. In the implementations shown in the figures, the retention member 20;20', shown in detail in FIGS. 7, 8, 12 and 13, comprises two arms 22,23;22',23' connected through the segment 21;21' on which the activation means 40;40' acts. The arms 22,23;22',23' are substantially parallel to each other. The segment 21;21' has a substantially flat surface 21a;21a' on which said activation means 40;40' act. In one implementation the activation means 40;40' acts substantially orthogonal to the substantially flat surface 21a;21a' of the segment 21;21'.

Figure 9:
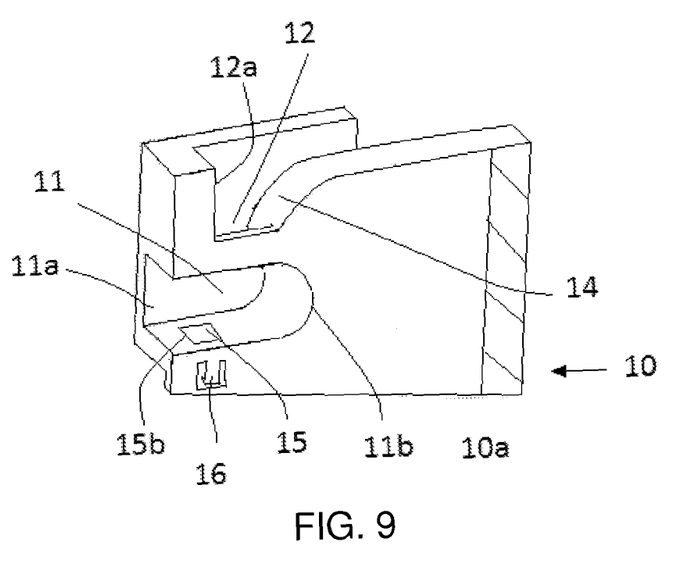
FIG. 9 shows a section view of a support piece included in FIG. 1.
Figure 10:
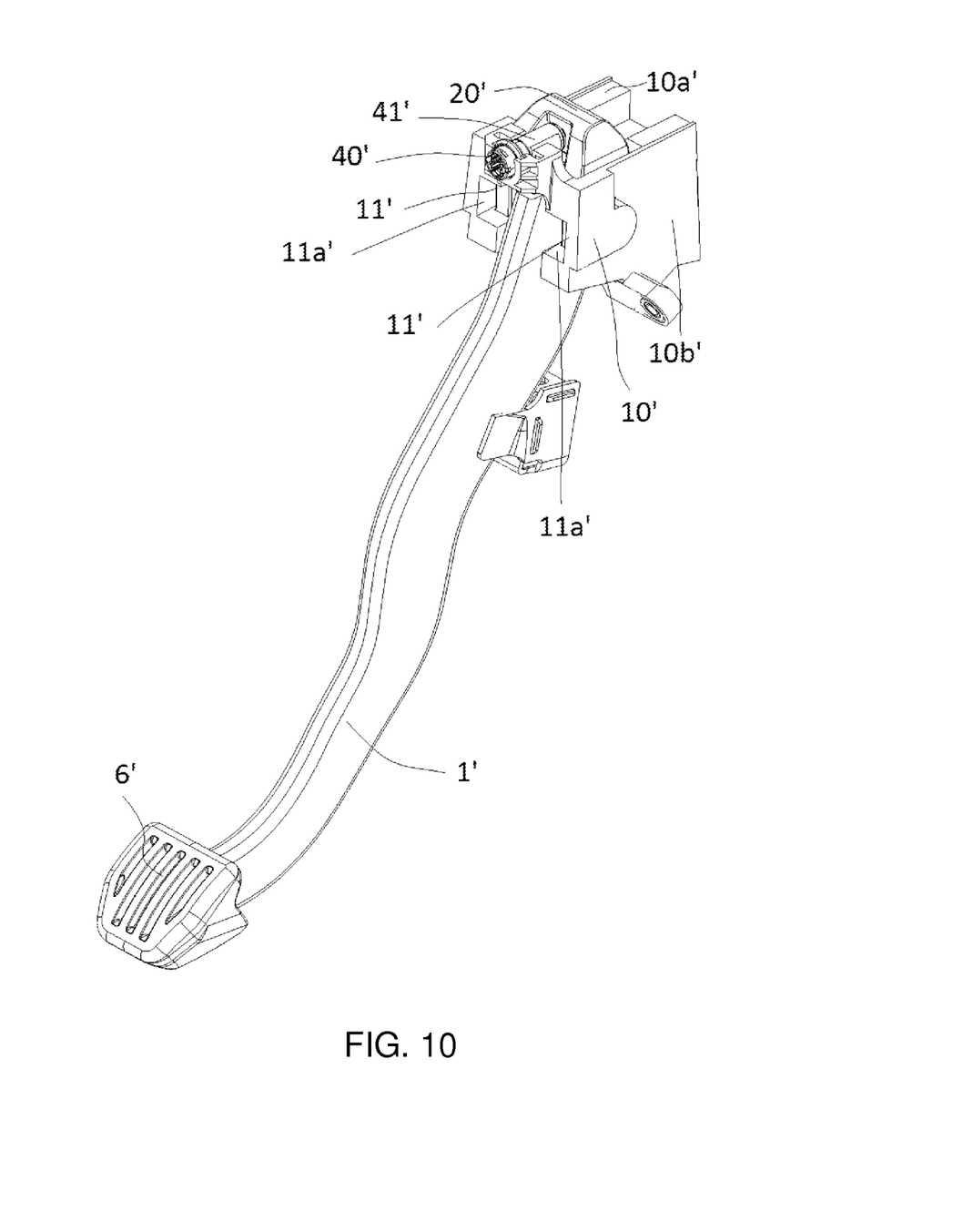
FIG. 10 shows a view of a second implementation of the pedal with a safety mechanism in normal operating conditions.
Figure 14:
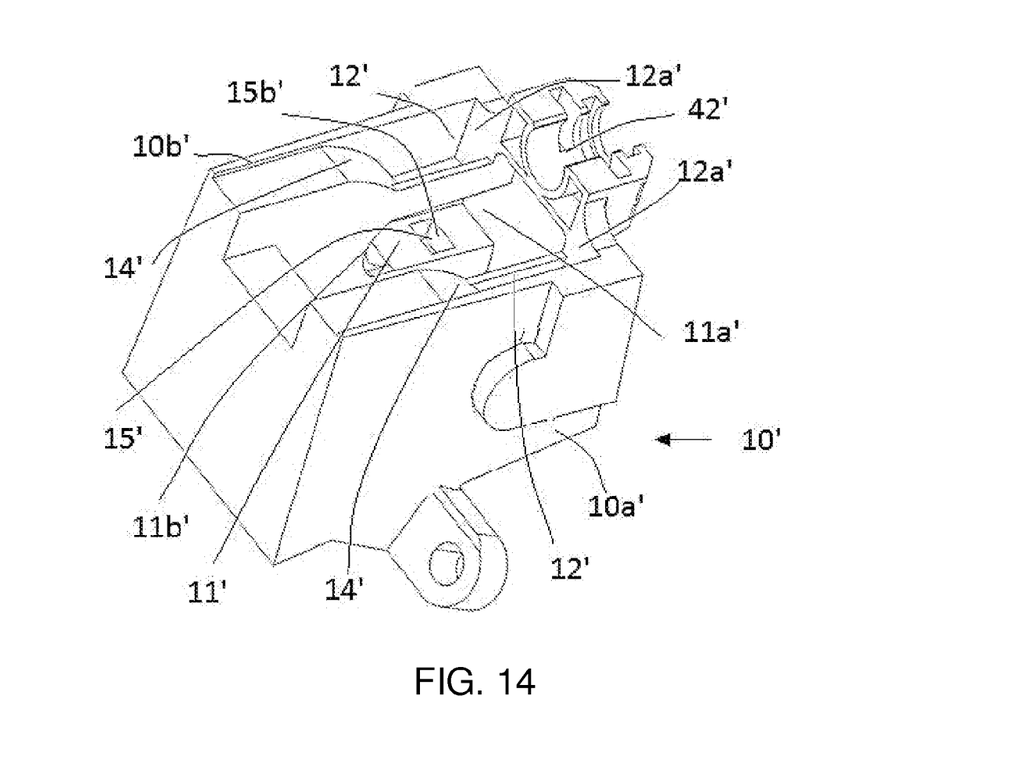
FIG. 14 shows a view of a support piece shown in FIG. 10.

In one implementation the support piece 10,10', shown in detail in FIGS. 9 and 14, comprises two walls 10a,10b;10a', 10b' substantially parallel to each other, each one of which comprises a housing 11;11' in which is arranged attached one end of the rotation shaft 2,2'. The housings 11;11' are arranged substantially parallel to each other, each one of them including a closed end 11b;11b' with a shape adapted to the rotation shaft 2;2'. In the embodiments shown in the figures, the housing 11;11' has an open end 11a;11a'.

In one implementation each arm 22,23;22',23' of the support piece 10;10' is arranged inserted tightly in a corresponding cavity 12;12' of the support piece 10;10'. Each cavity 12;12' is comprised in the corresponding wall 10a,10b;10a', 10b' of the support piece 10;10', each cavity 12;12' being arranged connected to the corresponding housing 11;11'. Each cavity 12;12' is delimited at least by a guide surface 14;14', the function of which is detailed below, and by a limiting surface 12a;12a', both guide surfaces 14;14' and limiting surfaces 12a;12a' being arranged facing each other.

In one implementation each arm 22,23;22',23' comprises a retention surface 22a,23a; 22a',23a', shown in detail in FIGS. 4, 5, 7, 8, 12, 13, 15, 16 and 17, which retains the rotation shaft 2;2' against the closed end 11b;11b' of the housing 11;11'. In one implementation the retention surface 22a,23a;22a',23a' has the shape substantially of the arc of a circle, adapted to the shape of the rotation shaft 2;2'.

Figure 4:
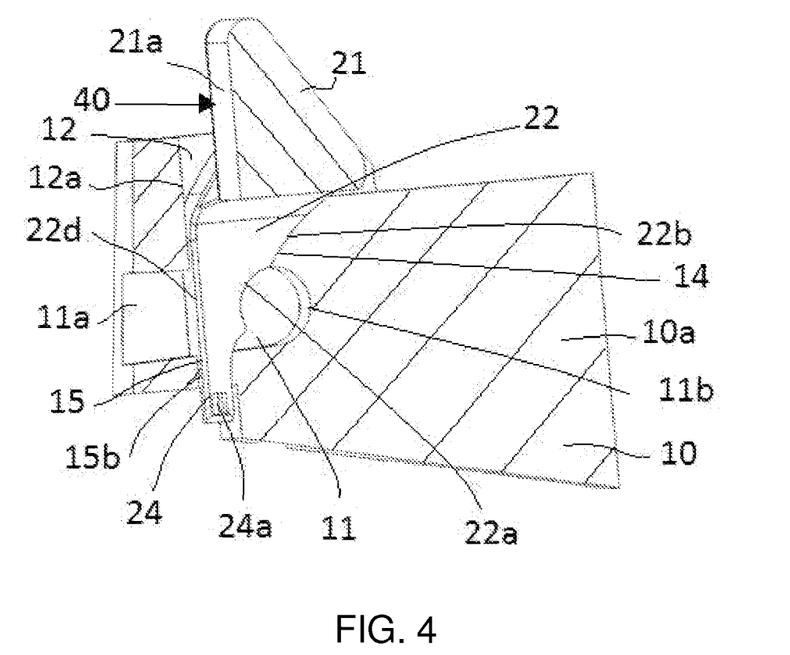
FIG. 4 shows a detailed view of the pedal with the safety mechanism shown in FIG. 1.
Figure 15:
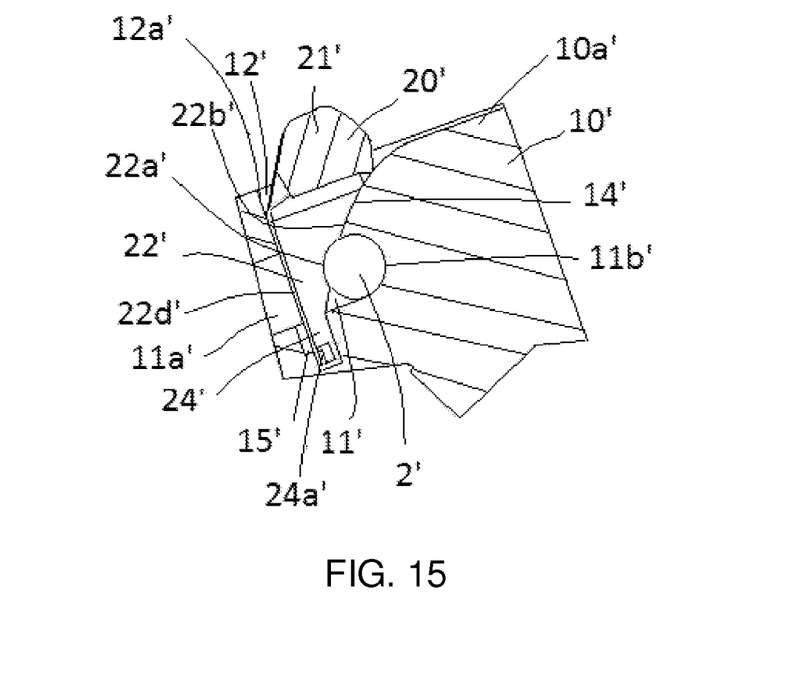
FIG. 15 shows a partial section view of the pedal with the safety mechanism shown in FIG. 10 in a normal operating position.

The retention member 20;20' also comprises a contact surface 22b,23b;22b',23b' on each arm 22,23;22',23', shown in detail in FIGS. 4, 5, 7, 8, 12, 13, 15, 16 and 17, adapted to the corresponding guide surface 14;14' of the support piece 10;10', both surfaces 22b,23b,14; 22b',23b',14' being arranged in contact in normal operating conditions of the pedal 1;1', as shown in FIGS. 4 and 15. In the implementation shown in the figures, both the guide surface 14;14' and the contact surface 22b,23b;22b',23b' are curved surfaces. Each contact surface 22b,23b;22b',23b' extends continuous to the respective retention surface 22a,23a; 22a',23a'. In other implementations not shown, the guide surface 14;14' and the contact surface 22b,23b;22b',23b' may not be curved surfaces. The contact surface 22b,23b;22b',23b' may not extend continuous to the respective retention surface 22a,23a; 22a', 23a'.

In addition, during the normal operating of the pedal 1;1', the retention member 20;20' is arranged fixed to the support piece 10;10'. In the implementations shown, each arm 22,23; 22',23' comprises a substantially flat surface 22d,23d;22d', 23d' that is arranged facing the limiting surface 12a;12a' of the cavity 12;12' of the support piece 10;10', in a normal operating position of the pedal 1;1'. In one implementation the surfaces 22d,23d;22d',23d' of each arm 22,23;22',23' and the surface 21a;21a' of the segment 21;21' on which the activation means 40;40' act are substantially parallel to each other. In other implementations not shown in the figures, the surface 22d,23d;22d',23d' of each arm 22,23;22',23' may not be flat. Similarly, the surfaces 22d,23d;22d',23d' of each arm 22,23;22',23' of each arm and the surface 21a;21a' of the segment 21;21' may not be parallel to each other.

In some implementations one end 24,25;24',25' of the arm 22,23;22,23' is arranged housed in a recess 15;15' comprised in each wall 10a,10b;10a',10b' of the support piece 10;10', passing at least partly through said recess 15;15'. The recess 15;15' shown in FIGS. 2, 4, 9, 11, 14, 16 and 17 is connected to the corresponding housing 11;11' in the support piece 10;10'. Said recess 15;15' has a substantially rectangular section. During the normal operating of the pedal, shown in FIGS. 1, 3, 4, 10 and 15, when the shoe 6;6' is operated by the user, the rotation shaft 2;2' presses against the retention member 20;20', pushing said retention member 20;20' against the limiting surface 12a;12a' of the cavity 12;12' and against a delimiting surface 15a;15a' of the corresponding recess 15;15'. The retention member 20;20' retains the rotation shaft 2;2' inside the support piece 10;10', directly transmitting the force of the shaft 2;2' to the support piece 10;10' in an efficient manner.

Figure 6:
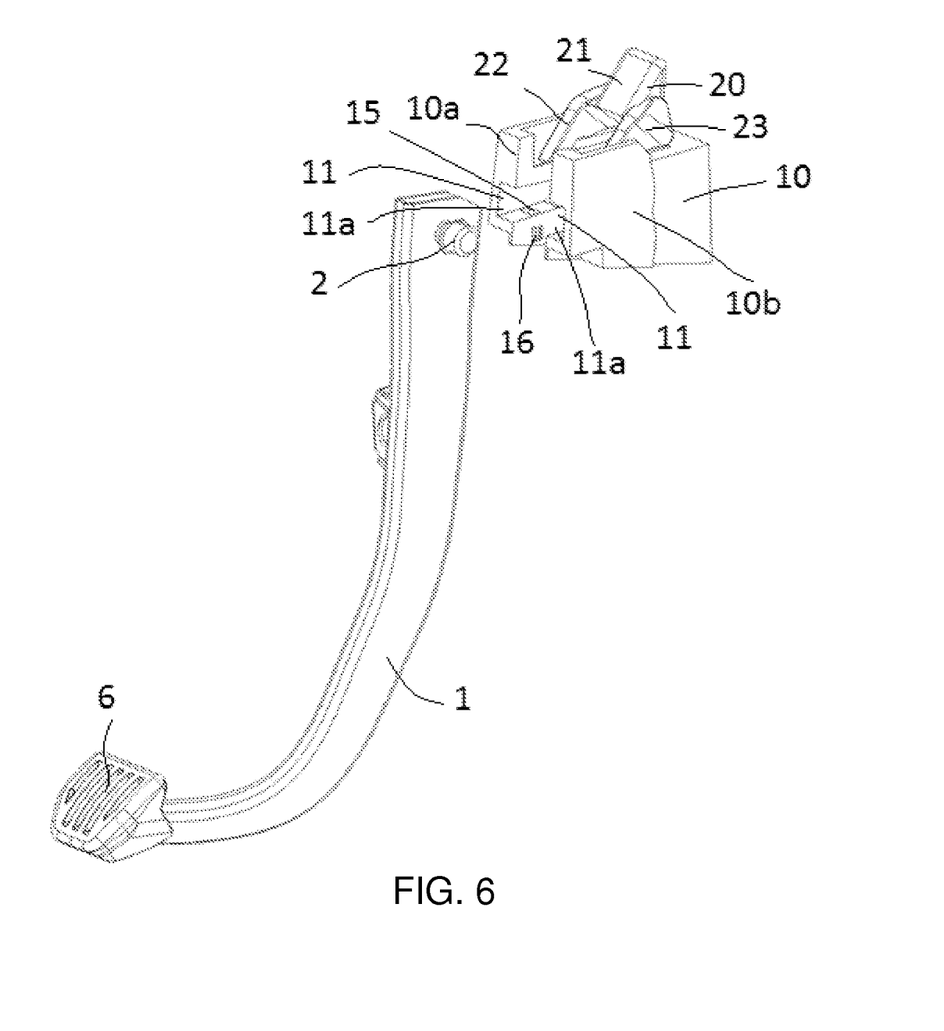
FIG. 6 shows a view of the pedal with the safety mechanism shown in FIG. 1 released from a support piece.
Figure 7:
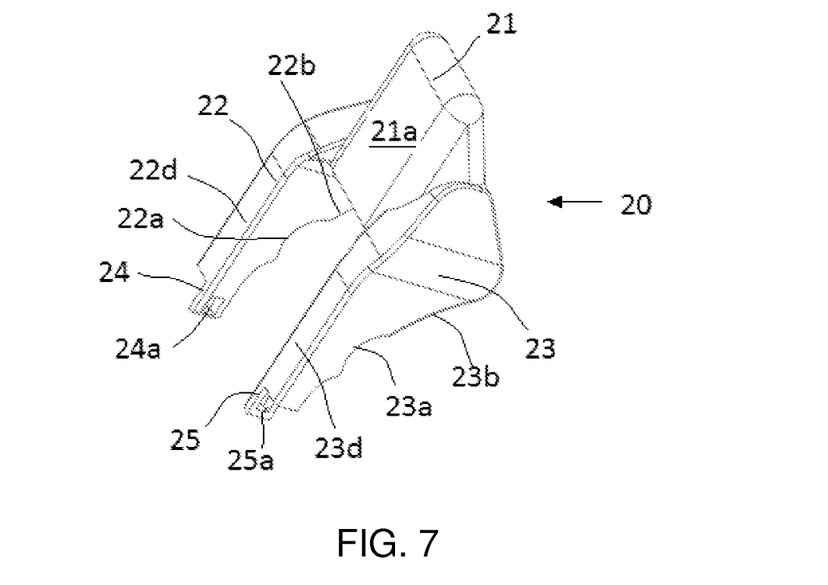
FIG. 7 shows a view of a retention member of the safety mechanism shown in FIG. 1.
Figure 8:
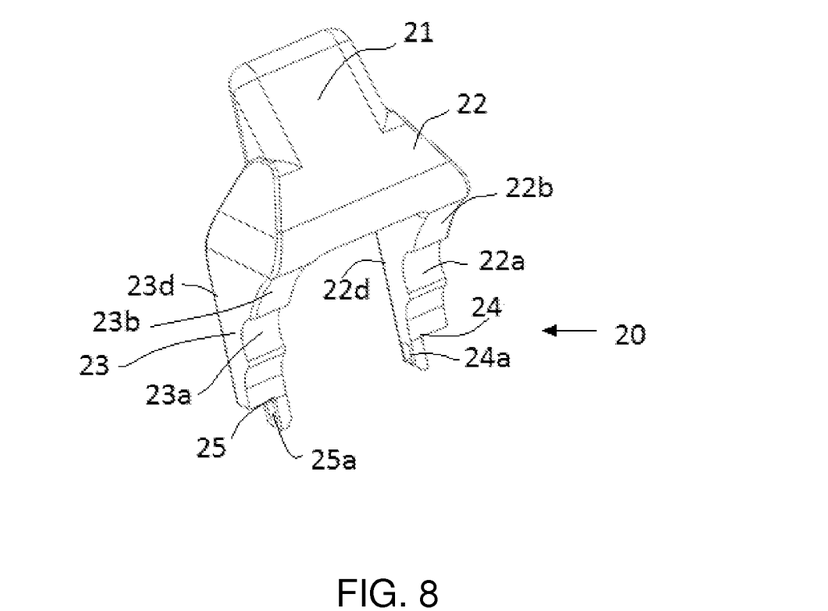
FIG. 8 shows another view of a retention member of the safety mechanism shown in FIG. 1.
Figure 11:
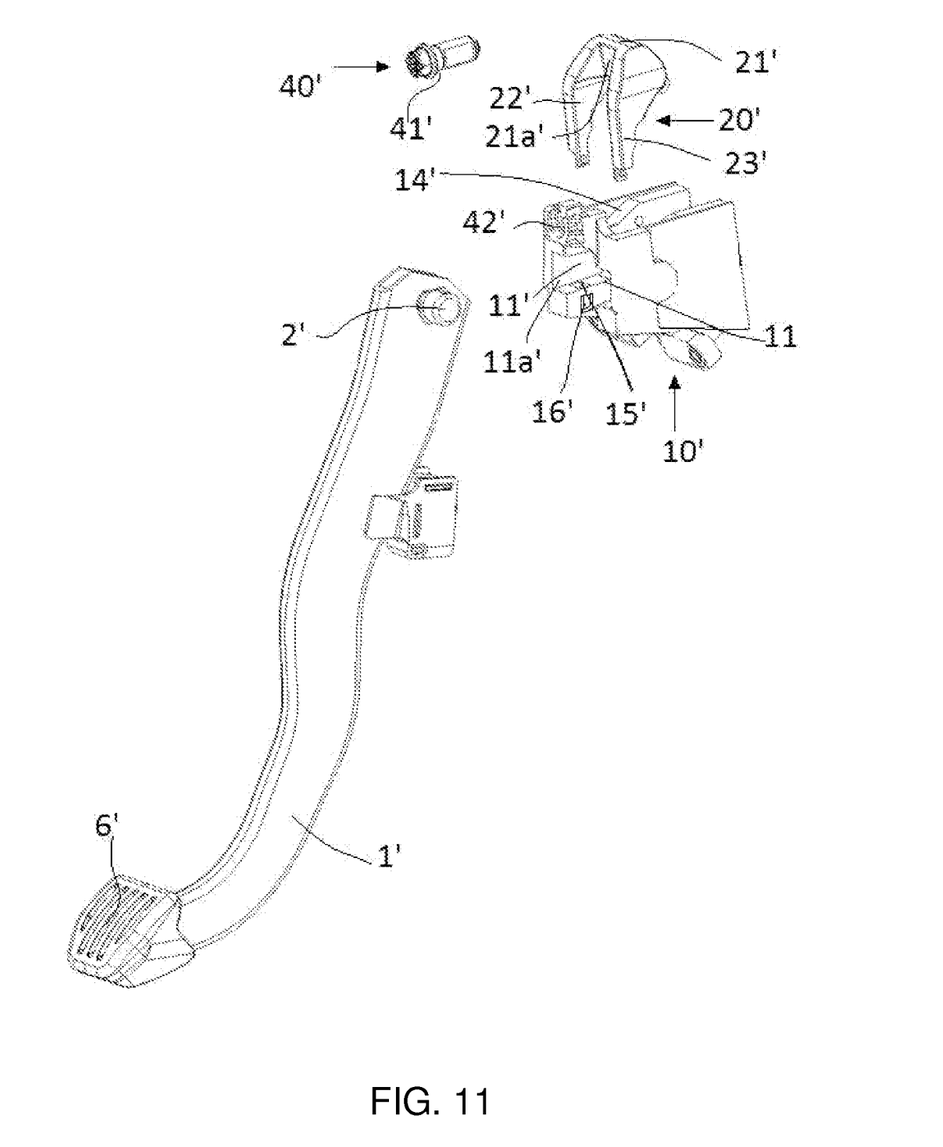
FIG. 11 shows an exploded view of the pedal shown in FIG. 10.
Figure 12:
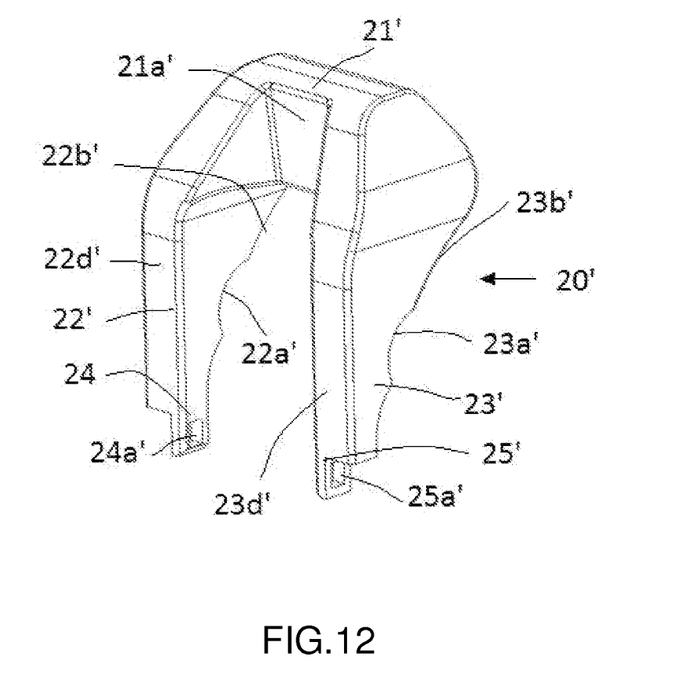
FIG. 12 shows a view of a retention member of the safety mechanism shown in FIG. 10.
Figure 13:
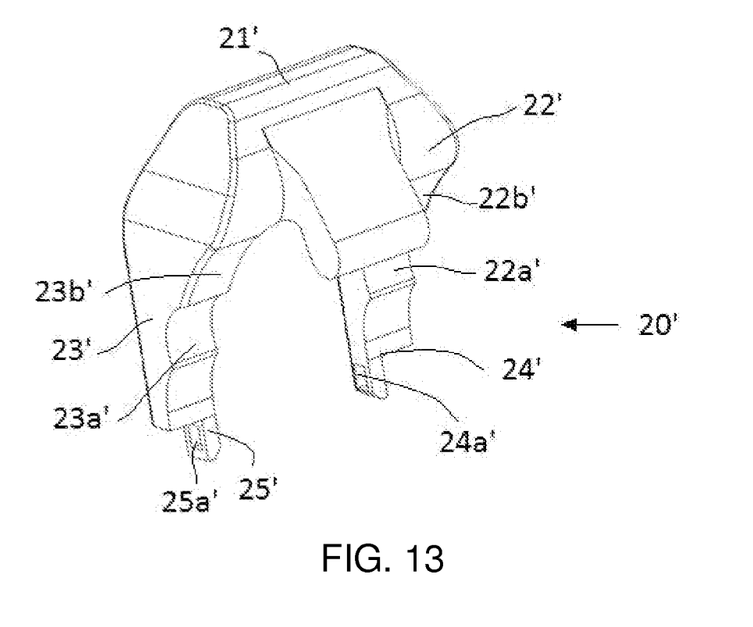
FIG. 13 shows another view of a retention member of the safety mechanism shown in FIG. 10.

In one implementation, in order to keep the retention member 20;20' fixed to the support piece 10;10' during the normal operating of the pedal 1;1', the support piece 10;10' comprises a tab 16;16' on each wall 10a;10a', shown in FIGS. 6 and 11, oriented towards the inside of the corresponding recess 15;15', which cooperates with a hole 24a,25a;24a',25a' comprised in the end 24,25;24',25' of the arm 22,23;22,23', fixing the retention member 20;20' to the support piece 10;10'.

In the normal operating position of the pedal 1;1', the retention member 20;20', in particular the segment 21;21' of the retention member 20;20', projects out in relation to the support piece 10;10'. In one implementation the segment 21,21', shown in detail in FIGS. 7 and 8, projects out in relation to the arms 22,23;22',23'.

Figure 1:
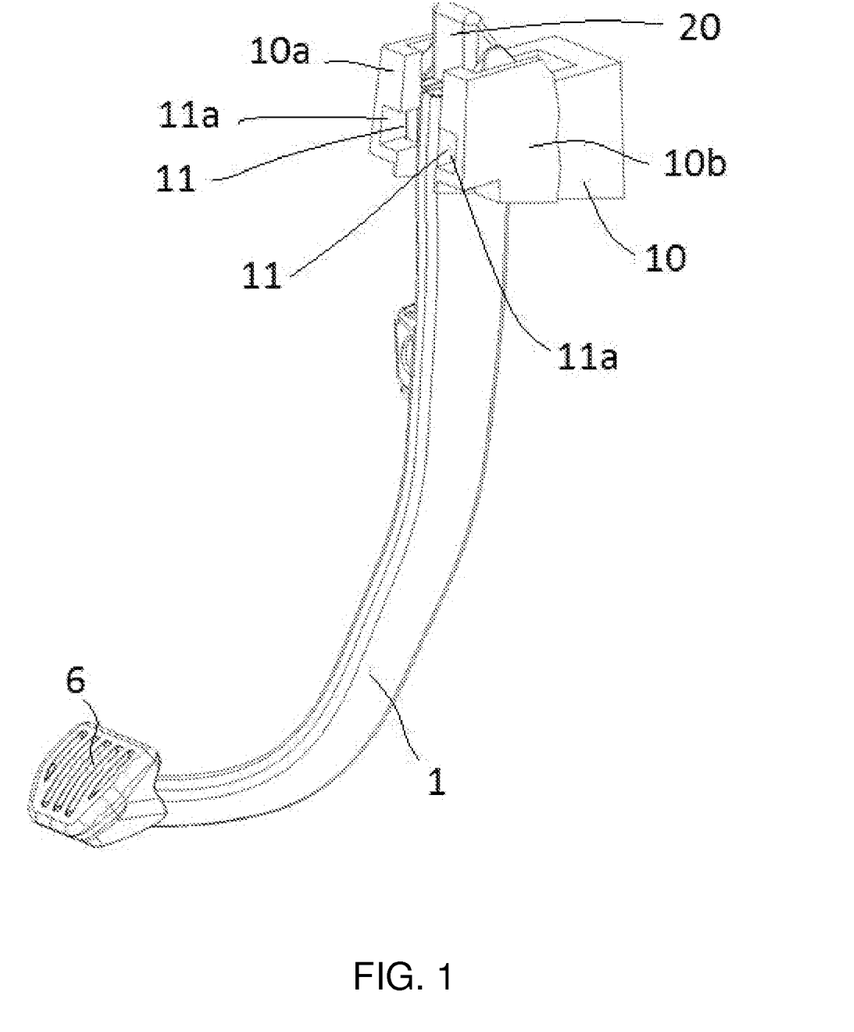
FIG. 1 shows a first implementation of a pedal with a safety mechanism in normal operating conditions.
Figure 2:
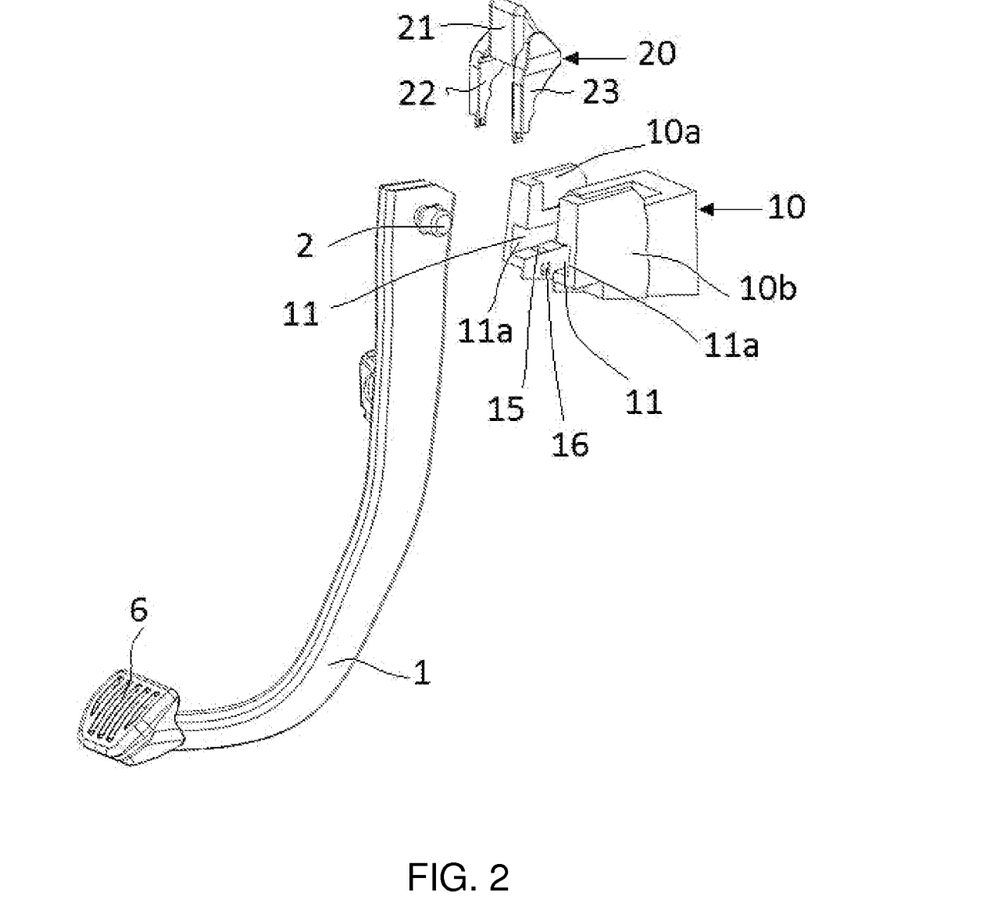
FIG. 2 shows an exploded view of the pedal with the safety mechanism shown in FIG. 1.
Figure 3:
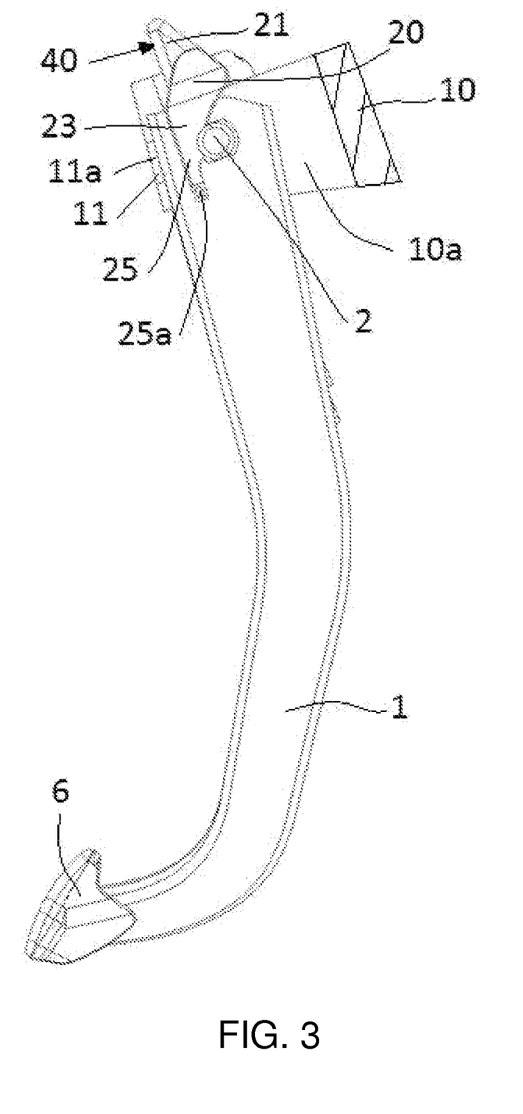
FIG. 3 shows a side view of the pedal shown in FIG. 1, with the safety mechanism partly sectioned.

With the pedal 1 with the safety mechanism, shown in FIGS. 1 to 9, the activation means 40 comprises a substantially deformation-resistant part of the vehicle, said substantially deformation-resistant part being represented in FIGS. 3 and 4 by means of an arrow that indicates the direction of activation of the substantially deformation-resistant part of the retention member 20.

Figure 5:
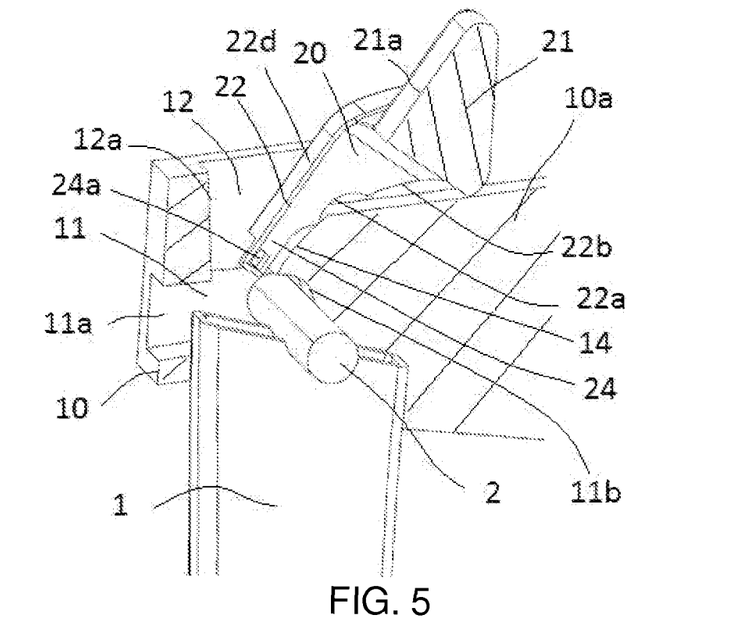
FIG. 5 shows a partial view of the pedal with the safety mechanism shown in FIG. 1, with the safety mechanism activated.

When a head-on collision occurs, the substantially deformation-resistant part of the motor vehicle exerts a force on the flat surface 21a of the segment 21 of the retention member 20, moving the retention member 20 in relation to the support piece 10. The movement is guided by the guide surfaces 14 of the support piece 10, the contact surface 22b,23b of each arm 22,23 cooperating with the guide surface 14 to a position in which the retention member 20 does not retain the shaft 2, as shown in FIG. 5, the rotation shaft 2 being capable of moving along the respective housings 11 and releasing itself from the support piece 10.

In the implementation shown in FIGS. 10 to 17, the activation means 40' comprise a pyrotechnic actuator 41' that is arranged housed in the support piece 10', in particular in a housing 42' comprised in the support piece 10'. The housing 42' is arranged substantially centred in relation to the arms 22,23;22,23', the pyrotechnic actuator 41' acting against the segment 21' of the retention member 20' in a direction substantially orthogonal to the substantially flat surface 21a' of the segment 21, the rotation shaft 2' being capable of moving along the respective housing 11' of the support piece 10' and releasing itself from the support piece 10'.

Figure 16:
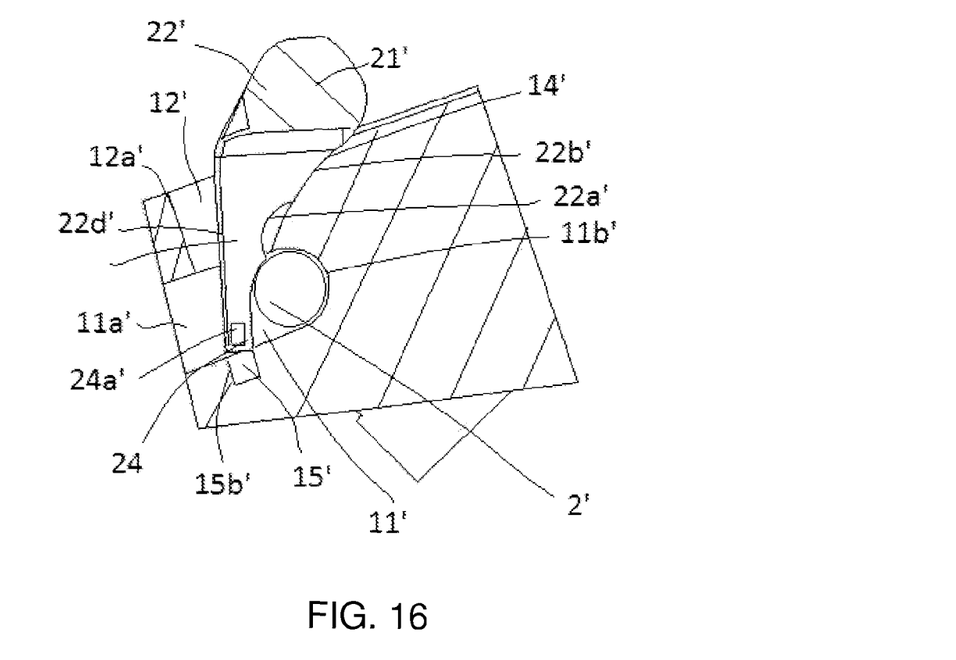
FIG. 16 shows a partial section view of the pedal with the safety mechanism shown in FIG. 10 during a head-on collision.
Figure 17:
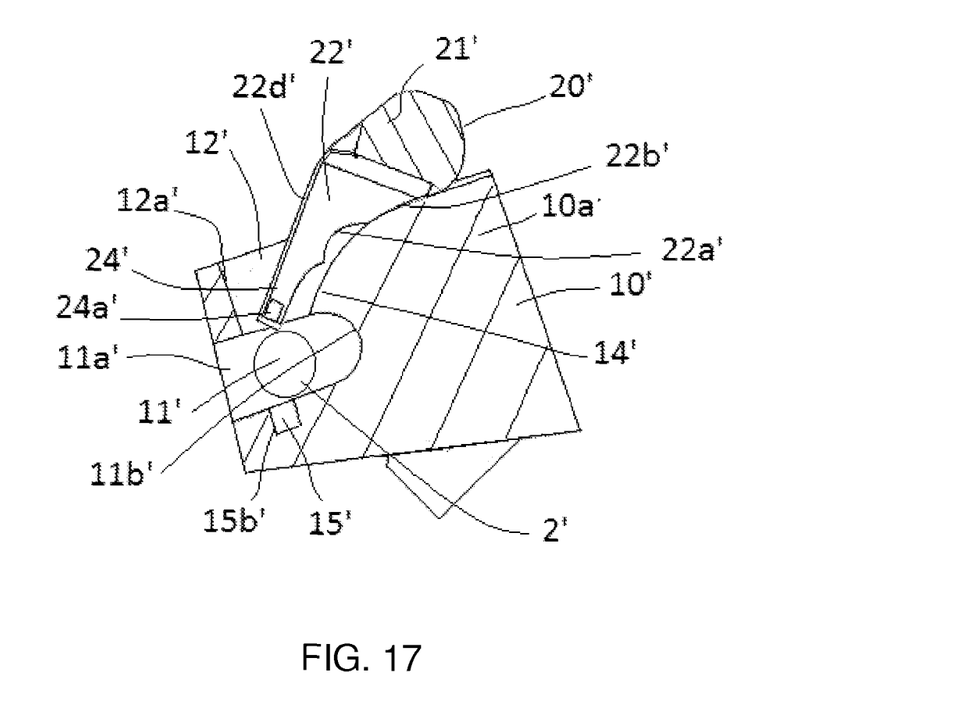
FIG. 17 shows a partial section view of the pedal with the safety mechanism shown in FIG. 10 after a head-on collision.

When a head-on collision occurs, the movable part of the pyrotechnic actuator exerts a force on the flat surface 21a' of the segment 21' of the retention member 20' that moves the retention member 20' in relation to the support piece 10'. The movement is guided by the guide surfaces 14' of the support piece 10', the contact surface 22b',23b' of each arm 22',23' cooperating with the guide surface 14' as shown in FIG. 16, to a position in which the retention member 20' does not retain the shaft 2', as shown in FIG. 17, the shaft 2' being capable of moving along the respective housings 11' and releasing itself from the support piece 10'.

What is claimed is:

1. A pedal assembly for a motor vehicle comprising:
a support piece comprising a housing and a guide surface situated outside the housing, the guide surface being a ramped surface,
a pedal having a rotating shaft, a first portion of the rotating shaft extending from a side of the pedal, in a normal operating condition the first portion of the rotating shaft residing in a fixed position inside the housing,
a retention member releasably secured to the support piece and moveable between a first position and a second position, the first position corresponding to the normal operating condition, the second position corresponding to a head-on collision condition, in the first position a first part of the retention member rests against and holds the first portion of the rotating shaft in the fixed position within the housing of the support piece and a first surface of the retention member rests against the guide surface of the support piece, the retention member further comprising a force receiving portion,
the retention member releasable from the support piece upon a force being applied to the surface of the force receiving portion in the event of the head-on collision, the first surface of the retention member adapted to ride along the guide surface of the support piece to cause the retention member to move from the first position to the second position in a manner that causes the first part of the retention member to be moved away from the first portion of the rotating shaft so that the first portion of the rotating shaft is moveable within the housing,
wherein the support piece comprises a limiting surface spaced apart from and facing at least a portion of the guide surface, the retention member comprising a second surface that abuts the limiting surface when the retention member is in the first position.

2. A pedal assembly according to claim 1, wherein the ramped surface is curved.

3. A pedal assemble according to claim 1, wherein the housing of the support piece has a first end comprising a wall, in the fixed position the first portion of the rotating shaft abuts a surface of the wall.

4. A pedal assembly according to claim 3, wherein the housing of the support piece comprises an open end opposite the first end.

5. A pedal assembly according to claim 3, wherein the first part of the retention member and the wall of the housing is adapted to an outer shape of the first portion of the rotating shaft.

6. A pedal assembly according to claim 3, wherein the surface of the wall is adapted to an outer shape of the first portion of the rotating shaft.

7. A pedal assembly according to claim 1, wherein the housing of the support piece comprises an open end.

8. A pedal assembly according to claim 1, wherein the first part of the retention member is adapted to an outer shape of the first portion of the rotating shaft.

9. A pedal assembly according to claim 1, wherein the first surface of the retention member and the guide surface of the support piece are complementary surfaces.

10. A pedal assembly according to claim 1, wherein the guide surface and limiting surface of the support piece have different angular orientations.

11. A pedal assembly according to claim 10, wherein the limiting surface of the support piece is a substantially flat surface.

12. A pedal according to claim 1, wherein the housing of the support piece comprises an aperture disposed in a wall of the housing, in the first position a first end of the retention member is releasably secured within the aperture so that upon the force being applied to the surface of the force receiving portion of the retention member the first end is released from the aperture to permit movement of the retention member from the first position to the second position.

13. A pedal assembly for a motor vehicle comprising:
a support piece comprising first and second opposing walls, the first wall having a first housing and a first guide surface that is situated outside the first housing, the second wall having a second housing and a second guide surface that is situated outside the second housing, each of the first and second guide surfaces being a ramped surface,
a pedal having a rotating shaft with first and second portions of the rotating shaft extending from first and second sides of the pedal, respectively, in a normal operating condition the first and second portions of the rotating shaft residing in a fixed position inside the first and second housings, respectively,
a retention member releasably secured to the support piece and moveable between a first position and a second position, the first position corresponding to the normal operating condition, the second position corresponding to a head-on collision condition, in the first position first and second parts of the retention member rest against and hold the first and second portions of the rotating shaft in the fixed position within the first and second housings of the support piece, respectively, and first and second surfaces of the retention member rest against the first and second guide surfaces of the support piece, respectively, the retention member further comprising a force receiving portion, the retention member releasable from the support piece upon a force being applied to the surface of the force receiving portion in the event of the head-on collision, the first and second surfaces of the retention member adapted to ride along the first and second guide surface of the support piece, respectively, to cause the retention member to move from the first position to the second position in a manner that causes the first and second parts of the retention member to be moved away from the first and second portions of the rotating shaft, respectively, so that the first and second portions of the rotating shaft are moveable within the first and second housing, respectively, wherein the support piece comprises first and second limiting surfaces that are respectively spaced apart from and facing at least a portion of the first and second guide surface, the retention member comprising second and third surfaces that respectively abut the first and second limiting surfaces when the retention member is in the first position.

14. A pedal assembly according to claim 13, wherein the ramped surfaces are curved.

15. A pedal assemble according to claim 13, wherein each of the first and second housing of the support piece has a first end comprising a wall, in the fixed position the first and second portions of the rotating shaft abut a surface of the wall in the respective first and second housings.

16. A pedal assembly according to claim 15, wherein each of the first and second housing of the support piece comprises an open end opposite the first end.

17. A pedal assembly according to claim 15, wherein each of the first and second parts of the retention member and each of the walls in the first and second housings is adapted to an outer shape of the first and second portions of the rotating shaft, respectively.

18. A pedal assembly according to claim 15, wherein the surface of each of the walls is adapted to an outer shape of the respective first and second portions of the rotating shaft.

19. A pedal assembly according to claim 13, wherein each of the first and second housing of the support piece comprises an open end.

20. A pedal assembly according to claim 13, wherein each of the first and second parts of the retention member is adapted to an outer shape of the first and second portions of the rotating shaft, respectively.

21. A pedal assembly according to claim 13, wherein the first and second surfaces of the retention member and the first and second guide surface of the support piece are respectively complementary surfaces.

22. A pedal assembly according to claim 13, wherein the first and second guide surfaces and the first and second limiting surfaces of the support piece respectively have different angular orientations.

23. A pedal assembly according to claim 22, wherein the first and second limiting surfaces of the support piece are substantially flat surfaces.

24. A pedal assembly for a motor vehicle comprising:
a pedal having a rotating shaft, a first portion of the rotating shaft extending from a side of the pedal,
a support piece attachable to a deformable part of the motor vehicle, the support piece comprising a housing for receiving the first portion of the rotating shaft, the housing having an open first end and a second end opposite the open first end, the support piece further comprising a cavity positioned above and opening into the housing, the cavity at least partially defined by a limiting surface and a ramped guide surface, at least a portion of the limiting surface and a portion of the ramped guide surface facing one other, in a normal operating condition the first portion of the rotating shaft resides inside the housing and abuts a surface of the second end of the housing,
a retention member moveable between a first position and a second position, the first position corresponding to the normal operating condition, the second position corresponding to a head-on collision condition, in the first position the retention member comprising a first arm that at least partially resides in the cavity, the first arm extending into the housing of the support piece, the first arm having generally opposing first and second surfaces, the first surface abutting the limiting surface of the cavity, the second surface comprising a first section and a second section, the first section comprising a recess, the first portion of the rotating shaft residing between the recess and the second end of the housing when the retention member is in the first position, the second section shaped to at least partially abut the ramped guide surface of the cavity, the retention member further comprising a force receiving segment attached to the first arm,
the retention member releasable from the support piece upon a force being applied to the force receiving segment, the ramped guide surface of the support piece configured to guide the retention member from the first position to the second position in a manner that causes the recess in the first arm to be moved away from the first portion of the rotating shaft so that the first portion of the rotating shaft is moveable within the housing away from the second end.

25. A pedal assembly according to claim 24, wherein the limiting surface of the cavity and the first surface of the first arm are each substantially flat.

26. A pedal assembly according to claim 24, wherein the second section of the second surface of the first arm and the ramped guide surface of the cavity in the support piece are complementary surfaces.

27. A pedal assembly according to claim 24, wherein the shape of the recess is adapted to an outer shape of the first portion of the rotating shaft.

28. A pedal assembly according to claim 27, wherein the second end of the housing is adapted to an outer shape of the first portion of the rotating shaft.

29. A pedal assembly according to claim 24, wherein the ramped surface is curved.

30. A pedal assembly according to claim 24, wherein the second end of the housing is adapted to an outer shape of the first portion of the rotating shaft.

31. A pedal according to claim 24, wherein the support piece further comprises an aperture disposed in a wall of the housing near the open first end, the first arm having a first end that resides within the aperture where it is releasable secured to the support piece whereupon when the force is applied to the surface of the force receiving portion of the retention member the first end of the first arm is released from the aperture to permit movement of the retention member from the first position to the second position.

32. A pedal assembly according to claim 24, wherein the first arm comprises a second end opposite the first end, the force receiving segment attached to the first arm at or near the second end.

* * * * *